United States Patent Office 3,510,292
Patented May 5, 1970

3,510,292
PROCESS FOR MAKING METAL/METAL OXIDE COMPOSITIONS
John F. Hardy, Andover, and Merrill E. Jordan, Walpole, Mass., assignors to Cabot Corporation, Boston, Mass., a corporation of Delaware
No Drawing. Continuation-in-part of application Ser. No. 400,590, Sept. 30, 1964. This application Jan. 11, 1967, Ser. No. 608,509
Int. Cl. B22f
U.S. Cl. 75—.5
19 Claims

ABSTRACT OF THE DISCLOSURE

The present invention relates to a process for producing metal/metal oxide powder mixtures useful for applications in the powder metallurgy arts.

Said process is characterized broadly by the steps of:
(A) providing a slurry comprising
(1) a liquid medium having dissolved therein
(a) a metal compound the corresponding oxide(s) of which can be readily converted to the corresponding free metal by carbon reduction, and
(b) a metal compound the corresponding oxide(s) of which cannot be readily converted to the corresponding free metal by carbon reduction, and
(2) carbon black
(B) spray drying said slurry, and
(C) heat treating the dried product under appropriate conditions to result in conversion of the metal compound of Group $a$ to the free metal and conversion of the metal compound of Group $b$ to the metal oxide(s).

---

The present application is a continuation-in-part of copending U.S. application No. 400,590, filed Sept. 30, 1964, now abandoned.

Finely divided metal/metal oxide mixtures are used extensively as starting materials for the production of metallurgical materials known to the art as dispersion strengthened alloys, cermets and the like. Generally such mixtures are produced by blending, in the desired proportions, selected finely-divided metal and metal oxide powders. Said finely-divided metal or metal oxide powders are normally produced by vaporization or fuming techniques or by processes involving elaborate and highly specialized attrition techniques. Accordingly, such powders are rather expensive because of the intricate processes involved in producing them. In view of the growing need for powder mixtures comprises finely-divided metals and metal oxides, particularly those having average particle diameters below about one micron, any process whereby such mixtures can be produced easily and in a simple and inexpensive fashion would indeed be a notable contribution to the art.

A principal object of the present invention is to provide an improved process for making the foregoing contribution to the powder metallurgical arts.

A more specific object of the present invention is to produce in an economical fashion improved metal/metal oxide compositions in finely-divided form.

Still another object of the present invention is to provide a simple process for producing improved metal/metal oxide compositions which can subsequently be treated to produce powdered metal products such as those known to the art as dispersion strengthened alloys and cermets.

Another specific object of the present invention is to provide a process for producing improved metal/metal oxide compositions having varying amounts of carbon intimately associated therewith.

Other objects and advantages of the present invention will in part be obvious to those well skilled in the art and will in part appear hereinafter.

In a very broad sense, the above-mentioned objects and advantages are realized in accordance with the practice of our invention by preparation of a feedstock slurry comprising carbon black and at least two different metal compounds in solution form, spray drying said slurry and converting the dried product in a heated environment suitable for converting the metal compounds to the corresponding metals and metal oxides.

Broadly, the metal compounds included within the scope of the present invention are those selected from two distinct groups. One group includes metal compounds, the oxides of which are readily reducible to the free metal by carbon. Typical metal compounds included within this group are compounds of metals such as copper, tungsten, zinc, lead, tin, iron, cobalt, nickel, manganese, vanadium, molybdenum, and mixtures of these. Hereinafter, the compounds of this group of metals will be referred to as the compounds of "Group $a$."

The remaining group of metal compounds of interest, i.e. those compounds to form part of the feedstock slurry with the compounds of Group $a$, broadly comprise those metal compounds, the oxides of which either cannot be reduced by carbon or which can be so reduced only with great difficulty, e.g. at conversion temperatures above about 2000° C. This group includes compounds of boron, thorium, aluminum, titanium, zirconium, tantalum, hafnium, uranium, magnesium, niobium, and mixtures of these. Hereinafter the compounds of this group of metals will be referred to as the compounds of "Group $b$."

The metal compounds to be utilized can comprise any soluble organic, inorganic and complex salts. Particularly suitable are the water soluble metal salts. Representative compounds of both Group $a$ and $b$ metal compounds include sulfates, chlorides, bromides, oxides, iodides, fluorides, nitrates, perchlorates, orthoarsenates, sulfides, acetates, citrates, oxalates, formates, benzoates, carbonates, oleates, and tartrates.

It is all important that metal compounds forming part of the feedstock slurry be in solution form. Thus, the choice of metal compounds and liquid media to be utilized in forming the feedstock slurry will obviously be dictated, to a large extent, by the solubility characteristics of the ingredients. Generally speaking any liquid medium which is inert with respect to the metal compounds and the carbon black, i.e. which does not react deleteriously with the feedstock ingredients (such as by reaction with the metal compound(s) to form a solid product) and which is relatively volatile is suitable for use in the process of the present invention. It should be noted that it is important that the volatility of the liquid medium chosen be such that it can be substantially completely removed by spray drying of the slurry prior to the conversion step. Thus, liquid media such as light hydrocarbons (heptane, hexane, decane, carbon tetrachloride, isopentane); lower alcohols (isopropanol, butanol, methanol); ketones (acetone, methyl ethyl ketone) and the like are often suitable. Much preferred as the liquid medium however due to the many suitable metal compounds soluble therein, the general chemical inertness and ready availability thereof, etc., is water.

For the purposes of the present invention the term, carbon black refers generally to products produced by the incomplete combustion and/or pyrolysis of hydrocarbon materials. Thus, for example, materials referred to in the art as acetylene blacks, lamp blacks, furnace blacks, thermal blacks, channel blacks, etc., are all included within the scope of the present invention.

The manner of combining the carbon black and the metal compounds is considered especially critical since this factor contributes significantly to the advantages of unusually facile conversion of the feedstock realized in the practice of our invention in the heat treating step. Thus, important principles of our invention reside not only in the ingredients and the form thereof utilized but also in the manner of intimately combining the metal compound ingredients in solution form with carbon black to produce a mixture which can be subsequently dried and converted in surprisingly easy fashion to metal/metal oxide compositions wherein the particles in most cases have average particle diameters below about one micron and generally below about 0.2 micron.

Having produced a suitable feedstock slurry comprising carbon black and a solution of the metal compounds of each of Groups $a$ and $b$ said slurry is thereafter spray dried to produce extremely uniform dry particles comprising the starting ingredients. Thereafter, said dry particles are heat treated at temperatures and atmospheres suitable for converting the reducible metal compound to the corresponding free metal and the nonreducible metal compound to the corresponding metal oxide. When the Groups $a$ and $b$ metal compounds contain oxygen, a reducing or inert atmosphere is normally suitable. When, however, the nonreducible metal compound(s) of Group $b$ does not contain oxygen or when the corresponding oxide is produced only with difficulty, it is preferred to heat treat said dry particles first under an oxidizing atmosphere thereby converting the metal compound(s) of Groups $a$ and $b$ to the corresponding oxide and subsequently under an inert or reducing atmosphere to convert the reducible metal oxide(s) formed from the Group $a$ metal compound(s) to the corresponding free metal(s). We have found that drying of the feedstock slurry by spray drying contributes materially to the ease by which the metal compound(s) forming part of the dried product is converted to the metal/metal oxide mixture.

It is pointed out that spray drying is quite different from conventional drying processes. For example, conventional drying of a mixture comprising a metal compound solution and carbon black would normally proceed by way of evaporation of the liquid from the surface of a presscake and the continuous replacement of this surface liquid by capillary movement of moisture from the interior portions thereof. Such uneven drying normally gives rise to agglomerates which are non-uniform in both size and composition. In spray drying, however, evaporation takes place from uniform droplets. Under such conditions, the resulting dry particles are normally relatively uniform in size and, of equal importance, have a uniform composition. In existing commercial spray drying equipment, the powdered product obtained by spray drying a solution or slurry is normally characterized by relatively spherical particles which are usually of a hollow or porous nature and are of relatively uniform particle size. In general, the average particle size of the dried product ranges between about 20 and 60 microns. The relatively small particle size of the spray dried product is another factor which is considered important. A more complete description of the details of commercial spray drying systems can be found in "Design and Use of Spray Dryers," pages 83–88 of Chemical Engineering, Sept. 30, 1963. It is to be understood, however, that the practice of our invention is not restricted solely to the processes and apparatus set forth in the aforesaid article. Instead, by "spray drying," we mean—and intend to include within the scope of the present invention—those drying processes wherein a slurry or dispersion is subdivided into and maintained as discrete, preferably uniform droplets while conducted through a zone heated to a temperature sufficient to dry same. Included within the scope of this definition are such processes as are characterized by contacting liquid droplets with a heated surface, provided, of course, that said droplets do not coalesce on said surface to form a continuous dried cake. Especially included are those spray drying processes in which the average particle size of the dried product is no greater than about 200 microns.

We are unable to explain precisely why our manner of combining said ingredients is so advantageous. However, we have found pronounced differences in the physical properties of intermediate mixtures similar to ours but which have been produced by combining the starting ingredients in a different manner. More specifically, we have found that the X-ray diffraction patterns of our dried carbon black/metal compounds feedstock mixtures differ quite distinctly from those of identical mixtures not obtained in accordance with the teachings of our invention. The most striking difference between said patterns resides in a marked suppression of the crystallinity of our mixtures. We believe this reduced or suppressed crystallinity to be a significant factor.

The advantages in the use of lower conversion temperatures and/or shorter reaction times in producing finely-divided metal/metal oxide compositions will be obvious to those skilled in the art. For example, lower conversion temperatures and/or shorter residence times in a conversion zone obviously imply many economic advantages in both the design of apparatus and operations thereof. Even more importantly, the use of lower temperatures and shorter residence times can eliminate or substantially minimize the sintering phenomenon which is normally an undersirable but inherent feature often encountered in prior art carbothermic conversions of metal compounds. Accordingly, by the practice of our invention there is provided a highly versatile and an especially simple and economical process for producing extremely finely-divided metal/metal oxide compositions which have heretofore been produced, if at all, only by highly elaborate, intricate and/or expensive techniques.

In addition to its ability to function as a reactant, the presence of carbon black in our metal compound feedstock slurries also contributes to the lower conversion temperatures and shorter reaction times realized in accordance with the practice of our invention. Also, the use of carbon black permits one to conveniently apply the practice of our invention to the production of metal/metal oxide mixtures having associated therewith selected amounts of carbon black.

The exact proportions in which the Groups $a$ and $b$ metal compound(s) and the carbon black are mixed will depend primarily on the intended use of the end product. In general, suitable proportions to arrive at any desired end product can be readily arrived at in practice. For example, when the practice of our invention is applied to the production of metal/metal oxide compositions suitable for conversion to dispersion strengthened alloys, the proportion of metal(s) of Group $a$ should comprise at least about 80% by weight of the total amount of metal in the initial mixture. In that case, the amount of carbon black utilized will normally be at least approximately equivalent to the stoichiometric amount required to convert all of the metal compound of Group $a$ to the corresponding free metal, although it is also contemplated that the amount of carbon black utilized can be slightly less than said stoichiometric amount.

Metal/metal oxide compositions suitable for conversion to products known to the art as cermets are also producible by the practice of our invention. In accordance with this aspect of our invention, the proportion of metal(s) of Group $a$ utilized initially should represent no more than about 50% by weight of the total amount of metal in the initial mixture. In this case also, the amount of carbon black in the mixture should normally be at least approximately equivalent to the stoichiometric amount required to convert all of the metal compound of Group $a$ to the corresponding free metal.

It is to be understood that the metal/metal oxide compositions produced in accordance with our invention can also comprise varying amounts of carbon black. However, we consider our process most valuable when applied to the production of finely-divided metal products of high purity, that is to say, metal/metal oxide compositions comprising very small quantities of carbon black, i.e. comprising less than about 10% by weight of the total composition of carbon black. Nevertheless, our process can be applied to the production of metal/metal oxide compositions comprising larger amounts of carbon black. Such compositions can be utilized as fillers in elastomeric or plastomeric compositions and accordingly, can contain up to about 90% by weight of carbon black if desired.

In the heat treatment step the temperature utilized to convert the metal compounds forming part of the spray dried feedstock to the corresponding free metal and metal oxide can vary over a wide range. In general, the range includes temperatures substantially below those normally required to convert the metal compound of Group $a$ to the free metal as well as temperatures that can exceed said normal conversion temperature by 400 or 500° F. and even more. The lower temperatures are of special utility when the conversion is achieved by way of batch type processes and/or when the hereinbefore mentioned sintering phenomenon is to be avoided or minimized. However, a more efficient method of producing free metal/metal oxide compositions is by way of a continuous process in which the intermediate dry particles comprising carbon black and the metal compounds are conveyed through a high temperature conversion zone while suspended in a fluid medium. In such continuous processes, it is obviously desirable to reduce residence time to a minimum in order to achieve maximum throughput and minimum sintering potential.

While the conversion parameters mentioned hereinbefore should be borne in mind, an additional factor to be considered in establishing the metes and bounds of the heat treatment step resides in the amount of residual carbon black desired in the final metal/metal oxide composition. For example, if the ultimate product is to be of high metal/metal oxide purity (i.e. low carbon black content) then a reducing atmosphere not only aids somewhat in rapidly converting the metal compound of Group $a$ to the corresponding free metal but also is advantageous when slightly less than the stoichiometric amount of carbon black required to react with all of the compound of Group $a$ is utilized.

With respect to the concentration of carbon black in our metal/metal oxide compositions, it is to be understood that the amount of carbon black in said compositions can be selectively adjusted by aftertreatment of the heat treated compositions to reduce the amount of residual carbon therein to any desired level. For example, the carbon content of our compositions can normally be easily adjusted by treatment thereof with steam.

The following examples are offered in part to illustrate the application of the teachings of our invention to the production of finely-divided compositions of commercial interest. However, these examples are also provided for the purposes of providing a fuller and more complete understanding of some of the operating details of the invention together with many of the advantages to be obtained from practicing same and should be considered as illustrative only and as in no sense limiting the scope of the present invention:

EXAMPLE 1

This example illustrates a manner of producing a dispersion strengthened alloy in accordance with the principles of our invention.

Nine lbs. of nickel sulfate were dissolved in 25 lbs. of water. The resulting solution was mixed with 700 grams of 30% by weight aqueous dispersion of a furnace carbon black and 800 grams of a 10% solution of aluminum sulfate. The mixture was spray dried at an inlet temperature of 425° F. and an outlet temperature of 225° F. The spray dried finely-divided product having an average diameter of about 40 microns was heat treated under an inert atmosphere at about 1500° F. for about 30 minutes. The relative weight percentages of the nickel containing constituents (Ni, NiO and NiSO$_4$) were determined by X-ray diffraction analysis of a sample of the resulting powder. The results of said analysis are shown in the table following Example 4. The remaining powder was subsequently subjected to hydrogen reduction at a temperature of about 1200° F. for about 30 minutes in order to reduce the residual nickel oxide to nickel metal. The final product was found to have an average particle diameter of less than 1 micron with many particles as fine as 10–20 millimicrons being detected. This product was then formed into mill products by pressing and sintering same in the manner described in detail in U.S. Pat. 3,087,234. Metallographic examination of sections of the sintered product revealed that substantially all of the aluminum sulfate content of the foodstock had been converted to aluminum oxide.

EXAMPLE 2

This example is essentially a duplicate of Example 1 with the exception that association of the carbon black with the metal compounds is not achieved until after the spray drying step. Accordingly, the aluminum sulfate and nickel sulfate solutions were mixed and spray dried under substantially the same drying conditions as provided in Example 1. The spray dried product was then blended for about four hours with about 210 grams of furnace carbon black in a twin cone blender operated at about 40 r.p.m. The resulting mixture was then heat treated in accordance with the regime of Example 1 and the resulting product analyzed for nickel containing constituents. The results of said analyses are provided in the table (Example 2) and show conclusively that the extent of conversion of the nickel compound is markedly less when the metal compound feedstock solution does not comprise carbon black.

EXAMPLE 3

This example is essentially a duplicate of Example 1 with the exception that drying of the liquid feedstock is accomplished by crystallization rather than spray drying. Accordingly, the feedstock slurry comprising the metal compounds, carbon black and water was placed in a nitrogen swept oven and heated to and maintained at about 225° F. for about 16 hours. The resulting dried cake was then pulverized lightly in a ball mill and sieved. The portion of the pulverized cake which passed through a 325 Tyler mesh sieve was then heat treated at about 1500° F. for about 30 minutes. Quantitative analyses of the product (table, Example 3) indicates that the conversion of the nickel compound of the feedstock produced in the present example occurred to a substantially lesser extent than was achieved in the conversion of the feedstock produced by the process of Example 1.

EXAMPLE 4

This example is essentially a duplicate of Example 1 with the exception that in the present example substantially no solution of the metal compounds is achieved. Accordingly, about 9 lbs. of nickel sulfate and about 80 grams of aluminum sulfate, each dry milled to an average particle size of about 5 microns, are charged into about 30 lbs. of dry hexane. The resulting mixture is continuously stirred and there is added thereto about 210 grams of furnace carbon black. The resulting mixture is spray dried and the dried product is sieved. That portion passing through a 325 Tyler mesh sieve is heat treated at 1500° F. for about 30 min. The relative weight percentage of the nickel containing constituents are determined by X-ray analysis, the results of which analysis are shown in the table, Example 4.

TABLE

|  | Weight Percentages | | |
|---|---|---|---|
|  | NiSO₄ | NiO | Ni |
| Example 1 | 0 | 15 | 85 |
| Example 2 | 70 | 15 | 15 |
| Example 3 | 40 | 10 | 50 |
| Example 4 | 55 | 20 | 25 |

EXAMPLE 5

This example illustrates a manner of producing a dispersion strengthened alloy.

237 grams of copper sulfate are dissolved in 1000 grams of water. This solution is then mixed together and with 120 grams of a 30% by weight aqueous dispersion of a furnace carbon black and 250 grams of a 10% by weight aqueous solution of aluminum sulfate. The resulting mixture is then spray dried. The spray dried product is heat treated for about 2 hours under helium at about 1750° F. to convert the copper sulfate to free copper metal. The resulting intimate mixture of copper metal and aluminum oxide is formed into mill products by pressing and sintering same in the manner described in U.S. Pat. 3,087,234.

It is to be understood that although only compounds of nickel, copper and aluminum are utilized in the above examples, similar results are achievable when other compounds of Group $a$ and/or Group $b$ are utilized. Accordingly, it is intended and it should be understood that the above disclosure is illustrative in nature and is not to be construed as limiting the scope of the present invention.

What is claimed is:

1. A process for producing finely-divided metal/metal oxide compositions comprising the steps of:
   (A) providing a slurry comprising
      (1) carbon black and
      (2) a liquid medium bearing in solution form
         (a) a metal compound, the oxides of which can be converted to the corresponding free metal by reaction with carbon, and
         (b) a metal compound, the oxides of which cannot be reduced by carbon
   (B) subdividing the said slurry into droplets and conducting said droplets through a zone heated to a temperature sufficient to evaporate the liquid medium therefrom, and
   (C) heating treating the resulting particles under suitable conditions to convert said metal compound of (a) to the corresponding free metal and said metal compound of (b) to the corresponding metal oxide.

2. The process of claim 1 wherein the dry particles produced in accordance with step (B) have an average particle diameter of less than about 200 microns.

3. The process of claim 1 wherein the dry particles produced in accordance with step (B) have an average particle diameter of less than about 60 microns.

4. The process of claim 1 wherein said metal compound of Group $(a)$ is chosen from the group consisting of compounds of copper, tungsten, iron, cobalt, nickel, molybdenum and mixtures thereof.

5. The process of claim 1 wherein said metal compound of Group $(a)$ is a compound of nickel.

6. The process of claim 1 wherein said metal compound of Group $(a)$ is a compound of tungsten.

7. The process of claim 1 wherein said metal compound of Group $(b)$ is chosen from the group consisting of boron, thorium, aluminum, titanium, zirconium, tantalum, hafnium, uranium, niobium and mixtures thereof.

8. The process of claim 1 wherein said metal compound of Group $(b)$ is a compound of aluminum.

9. The process of claim 1 wherein said metal compound of Group $(b)$ is a compound of thorium.

10. The process of claim 1 wherein said metal compound of Group $(a)$ is a compound chosen from the group consisting of compounds of copper, tungsten, iron, cobalt, nickel, molybdenum and mixtures thereof and said metal compound of Group $(b)$ is a compound of thorium.

11. The process of claim 1 wherein said metal compound of Group $(a)$ is a compound chosen from the group consisting of compounds of copper, tungsten, iron, cobalt, nickel, molybdenum and mixtures thereof and said metal compound of Group $(b)$ is a compound of aluminum.

12. The process of claim 1 wherein said metal compound of Group $(a)$ is a compound of nickel and said metal compound of Group $(b)$ is a compound of aluminum.

13. The process of claim 1 wherein said liquid medium is water.

14. The process of claim 1 wherein step (C) is accomplished by heat treating said particles in an oxidizing atmosphere sufficiently to convert said metal compounds of Groups $(a)$ and $(b)$ to the corresponding metal oxides followed by further heat treatment in a reducing or inert atmosphere to reduce the metal oxide formed from the metal compound of Group $(a)$ to the corresponding free metal.

15. The process of claim 1 wherein step (C) is accomplished in an inert atmosphere.

16. The process of claim 1 wherein step (C) is accomplished in a reducing atmosphere.

17. The process of claim 1 wherein the quantity of carbon black utilized is such that the resulting metal/metal oxide composition comprises less than about 10% by weight of carbon.

18. The process of claim 1 wherein step (C) is accomplished at temperatures below the sintering temperature of the metal/metal oxide composition produced.

19. The process of claim 1 wherein the quantity of the metal compound of Group $(b)$ utilized provides a metal content of between about 1 and about 20% by weight of the total metal content of said slurry.

References Cited

UNITED STATES PATENTS

| 2,761,776 | 9/1956 | Bichowsky | 75—0.5 |
| 2,893,859 | 7/1959 | Trifleman | 75—0.5 |
| 2,900,244 | 8/1959 | Bradstreet et al. | 75—0.5 |

L. DEWAYNE RUTLEDGE, Primary Examiner

W. W. STALLARD, Assistant Examiner

U.S. Cl. X.R.

75—206, 211